(12) United States Patent
Hewson

(10) Patent No.: US 12,728,616 B2
(45) Date of Patent: Sep. 8, 2026

(54) FILLER

(71) Applicant: Airbus Operations Limited, Bristol (GB)

(72) Inventor: Richard Hewson, Bristol (GB)

(73) Assignee: Airbus Operations Limited, Bristol (GB)

(*) Notice: Subject to any disclaimer, the term of this patent is extended or adjusted under 35 U.S.C. 154(b) by 236 days.

(21) Appl. No.: 18/756,099

(22) Filed: Jun. 27, 2024

(65) Prior Publication Data

US 2025/0001719 A1 Jan. 2, 2025

(30) Foreign Application Priority Data

Jun. 28, 2023 (GB) .................................... 2309715

(51) Int. Cl.

| | |
|---|---|
| ***B32B 3/08*** | (2006.01) |
| ***B32B 5/02*** | (2006.01) |
| ***B32B 27/06*** | (2006.01) |

(52) U.S. Cl.

CPC .................. *B32B 3/08* (2013.01); *B32B 5/02* (2013.01); *B32B 27/06* (2013.01); *B32B 2260/021* (2013.01); *B32B 2260/046* (2013.01); *B32B 2605/18* (2013.01)

(58) Field of Classification Search

CPC .. B32B 3/08; B32B 5/02; B32B 27/06; B32B 2260/021; B32B 2260/046; B32B 2605/18

USPC ........................................................ 428/177

See application file for complete search history.

(56) References Cited

U.S. PATENT DOCUMENTS

| | | | | |
|---|---|---|---|---|
| 2004/0150130 | A1 | 8/2004 | Cundiff et al. | |
| 2009/0110836 | A1* | 4/2009 | Petersson ........... | B29D 99/0005 106/400 |
| 2015/0283764 | A1* | 10/2015 | McCarville ........ | B29D 99/0005 428/161 |
| 2016/0303776 | A1 | 10/2016 | Oefner et al. | |
| 2023/0111679 | A1 | 4/2023 | Gurvich et al. | |
| 2025/0001719 | A1* | 1/2025 | Hewson ............. | B29D 99/0005 |

FOREIGN PATENT DOCUMENTS

| | | | |
|---|---|---|---|
| EP | 3957471 | A1 | 2/2022 |
| GB | 2588603 | A | 5/2021 |
| JP | 2019111807 | A | 7/2019 |
| WO | 2022023045 | A1 | 2/2022 |

OTHER PUBLICATIONS

Extended European Search Report for Application No. EP24177533.7, eight pages, dated Nov. 28, 2024.

Combined Search and Examination Report for GB 2309715.7, dated Dec. 18, 2023, 6 pages.

* cited by examiner

*Primary Examiner* — Betelhem Shewareged

(74) *Attorney, Agent, or Firm* — Nixon & Vanderhye, PC

(57) ABSTRACT

A filler for insertion between laminate composite parts, at least one of which has a corner radius, prior to joining together at a joint interface is disclosed. The filler is an elongate section shaped to mitigate ply undulations.

31 Claims, 10 Drawing Sheets

1
2
10
12
13
14
15
16
22

161
162
160
160
162
161
150
151
161
162
162
160
160
162
162
161

124
128
135
126
35
135
35

124
128
135
126
135

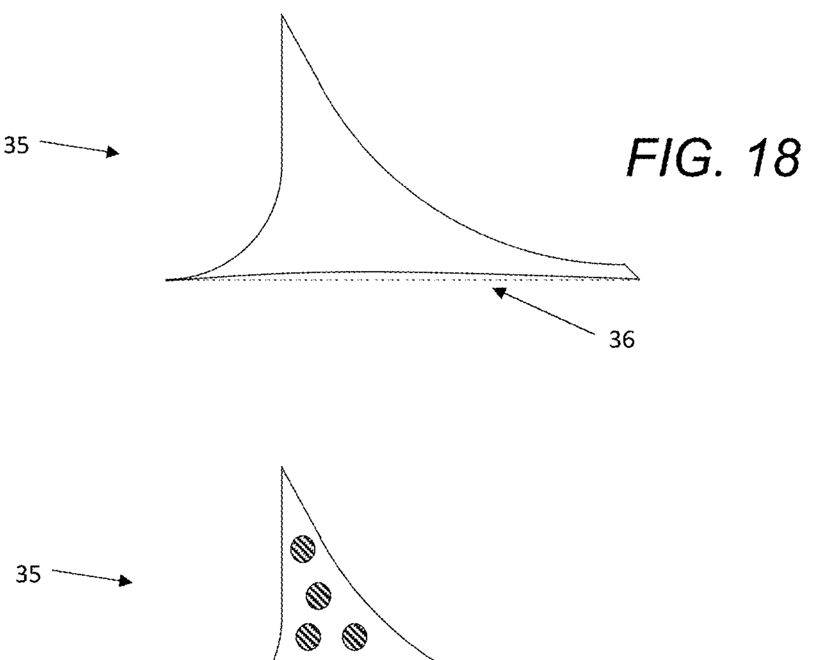
35
FIG. 18
36
35
35a
35b
35b
FIG. 19
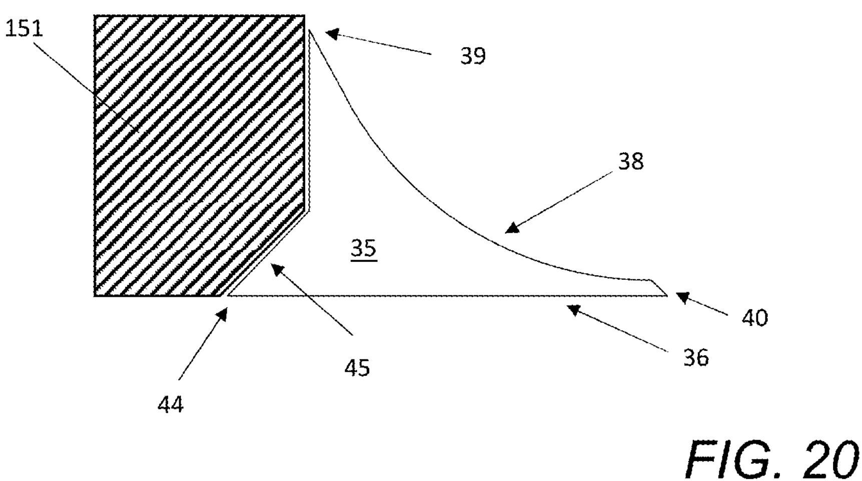
151
39
38
35
40
36
45
44
FIG. 20

FILLER

CROSS RELATED APPLICATION

This application claims priority to United Kingdom Patent Application GB 2309715.7, filed Jun. 28, 2023, the entire contents of which is hereby incorporated by reference.

FIELD OF THE INVENTION

The present invention relates to a filler for insertion between a first laminate composite part having a corner radius and a second composite part prior to joining together at a joint interface, a joint including the filler, and a method of forming the joint. The filler may form a permanent part of the joint, or may be a temporary filler to be removed once the joint is formed.

BACKGROUND OF THE INVENTION

WO2022023045 discloses the manufacture of composite components and sub-assemblies manufactured with co-infused, or co-cured, joints between components with single interface flanges, and panel components. Disclosed is an example of a cross-section of a co-infused spar and cover panel. In this example the corners of the two C-section spar elements, far left and far right, and the space between the two back to back C-section spar elements, middle, are supported by joint fillers.

These joint fillers are typically formed of carbon fibre-based composite material, for example including carbon fibre braids or bundles of unidirectional carbon fibre tows. These often require careful preparation in order to allow the final product to perform efficiently and to a high standard.

Alternatively, where the joint fillers are unnecessary because of the basic performance of an unsupported joint, then the filler may instead be a temporary filler used during the formation of the joint and then removed.

Whether a joint filler or a temporary filler is used, the structural performance of the composite parts forming the joint requires careful consideration during formation of the joint.

SUMMARY OF THE INVENTION

A first aspect of the invention provides a filler for insertion between a first laminate composite part having a corner radius and a second composite part prior to joining together at a joint interface, the filler is an elongate section comprising: a base side, a first side extending substantially normal to the base side, a second side is generally concave and extends along a radius curve substantially matching a convex outer surface formed by the corner radius of the first laminate composite part, and towards a first apex with the first side and towards a second apex with the base side, wherein the second apex is formed in a chamfer between the radius curve of the second side and the base side, the chamfer having an internal angle of between approximately 20 degrees and approximately 50 degrees.

The filler is elongate, i.e. it has a length significantly greater than its width or depth dimensions. The filler is an elongate section, i.e. it has a cross sectional profile shape normal to the axis of the length dimension. The cross sectional profile may be constant along the length of the filler. The sides of the section are the sides of the cross sectional profile. In this context, the filler may be a structural (load bearing) part adapted to transfer significant load between the first and second composite parts, or may be a non-structural (non-load bearing) part which generally lacks the ability to transfer any significant load between the first and second composite parts. The filler may be a temporary part used only during joining the first and second composite parts, or may be a permanent part used during joining the first and second composite parts and remaining joined with the first and second composite parts thereafter.

The invention is advantageous in that the internal angle of the chamfer forming the second apex of between approximately 20 degrees and approximately 50 degrees promotes better control of ply undulations in the first laminate composite part. If the internal angle of the chamfer is too small (less than approximately 20 degrees) then the filler becomes difficult to manufacture and handle as the 'knife edge' may become damaged during handling or removal of the filler. If the internal angle of the chamfer is too large (more than approximately 50 degrees) then when the first and second composite parts are being joined, the filler could cause an out of plane ply undulation in the outermost ply or outer plies of the first laminate composite part which exceeds a threshold with consequential detrimental effects on the performance of the corner radius of the first laminate composite part after the joint is formed. The out of plane ply undulation has an important parameter known as the ply angle, which is measured as the angle between the local tangent line of the intended profile of the ply and the tangent line of the local undulation in the ply. It has been found that ply undulation angles of more than 30 degrees are unfavourable and should be avoided when forming the joint between the first and second composite parts as these may impact the structural performance of the corner radius. Ply undulation angles of 30 degrees or less have been found to have manageable impacts on the structural performance of the corner radius, and ply undulation angles of 5 degrees or less have been found to have no impact on the structural performance of the corner radius. The internal angle of the chamfer forming the second apex has been found to be important to the ply undulation angle of the first laminate composite part.

The invention enables to constrain the potential for ply deviation within acceptable bounds, which maintains the structural performance whilst accepting that such deviations are present, and also secures the opportunity of removing permanent fillers without incurring any significant additional impacts where these fillers are not required.

The chamfer may be straight. A straight chamfer may create a planar face of the filler at an angle to the base side and to the second side.

The chamfer may transition into the second side as a curve to form a bullnose. A bullnose may create a planar face and a rounded edge. The planar face form may form an angle to the base side.

The second side may meet the straight chamfer or the bullnose at an inflection.

The inflection may be a smooth curve or a cusp.

The internal angle of the chamfer may be between approximately 30 degrees and approximately 45 degrees. It has been found that an internal angle of approximately 45 degrees+/−5 degrees may be optimal and that an internal angle of at least 30 degrees may be preferable for manufacturing and handling of the filler.

The chamfer may have a length (parallel to the base side) of between approximately 0.5 mm and approximately 2.0 mm, preferably around 1.0 mm.

The first apex may be formed in a knife edge between the radius curve of the second side and the first side.

The knife edge may have an internal angle of between approximately 15 degrees and approximately 35 degrees. It has been found that an internal angle of 30 degrees+/−5 degrees may be optimal to limit the ply undulation angle The internal angle of the knife edge may be approximately 30 degrees.

The knife edge may be straight and smoothly transition into the radius curve of the second side.

The knife edge may be smoothly curved into the radius curve of the second side.

The radius curve may have a constant radius.

The base side may be substantially straight.

The base side may be concave.

The section may have a third apex between the first side and the base side.

The third apex may have an internal angle of between approximately 20 degrees and approximately 50 degrees.

The first side may have a first portion extending substantially normal to the base side towards the first apex, and a second portion extending away from the first portion in a direction away from the second side and towards the third apex.

The second portion may be straight and forming an angle with the first portion. Alternatively, the second portion may be curved smoothly into the first portion.

The first side may be shaped to match with a surface of a tooling element for use with the filler during joining the first and second composite parts.

A further aspect of the invention provides a joint between a first composite part and a second composite part, the first composite part is a laminate having a corner radius and a first interface surface adjacent the corner radius, the second composite part has a second interface surface, the first interface surface is joined to the second interface surface, and further comprising a filler according to the first aspect, wherein the base side of the filler is positioned against the second composite part adjacent the second interface surface, and the second side of the filler is positioned against the radius corner of the first composite part.

The filler may be a temporary tooling element adapted to be removed from the joint between the first composite part and the second composite part before use.

The filler may alternatively be a permanent filler adapted to remain with the joint during use.

The first composite laminate part may have an outer ply at an outer radius of the corner radius, wherein the outer ply has an out of plane ply undulation angle, alpha, measured between a local tangent of an ideal curve around the corner radius and a tangent of a local ply undulation, and wherein alpha is not more than 30 degrees.

The filler may comprise polymer material, optionally a fibre reinforced polymer material.

A yet further aspect of the invention provides a method of joining a first composite part and a second composite part, comprising: providing a first composite part, wherein the first composite part is a laminate having a corner radius and a first interface surface adjacent the corner radius; providing a second composite part, wherein the second composite part has a second interface surface adjacent the first interface surface, providing a filler according to the first aspect and positioning the filler such that the second side of the filler is adjacent a convex outer surface formed by the corner radius of the first laminate composite part, and such that the base side of the filler is adjacent the second composite part, joining the first composite part to the second composite part by co-curing the first and second composite parts under positive pressure such that the filler is forced against the first and second composite parts during the cure.

The filler may be removed after the co-curing.

Forcing the filler against the first and second composite parts during the cure may cause the filler to form an out of plane ply undulation in an outer ply at an outer radius of the corner radius of the first composite laminate part, wherein the outer ply has an out of plane ply undulation angle, alpha, measured between a local tangent of an ideal curve around the corner radius and a tangent of a local ply undulation, and wherein alpha is not more than 30 degrees.

The base side of the filler may be concave such that the base side deforms to become substantially co-planar with the second composite part during the cure. Thermal expansion of the filler under pressure during the cure may cause the slightly concave base side of the filler component to flatten and become substantially co-planar as it co-cures with the second composite part. This may assist with forming a strong co-cured bonded interface between the filler and the second composite part, without the filler deforming into the second composite part.

Within the context of aerostructures the potential configurations of components covered by this invention include, but are not limited to, C-Section Spars and Cover panels, L-Section Stringers and Cover panels, and C-Section fuselage Frames and Cover panels; and I-Section and T-Section spars and stringers formed respectively of C-Section and L-Section parts with Cover panels.

The invention is particularly applicable to composite manufacturing technologies such as Resin Transfer Moulding (RTM), and is equally applicable to many closed-mould manufacturing technique, as well as open-mould manufacturing techniques, providing that a careful materials selection process is adhered to and that adequate additional structural support can be provided to the temporary tooling elements described herein.

A yet further aspect of the invention provides a filler for insertion between two first laminate composite parts each having a corner radius and arranged back to back prior to joining the two first laminate composite parts together at a joint interface, the filler is an elongate section comprising: a base side, a first side, and a second side, wherein the first side is generally concave and extends along a radius curve substantially matching a convex outer surface formed by the corner radius of one of the two first laminate composite parts, and towards a first apex with the second side and towards a second apex with the base side, wherein the second side is generally concave and extends along a radius curve substantially matching a convex outer surface formed by the corner radius of the other one of the two first laminate composite parts, and towards the first apex with the first side and towards another second apex with the base side, wherein each second apex is formed in a chamfer between the radius curve of the respective second side and the base side, the chamfer having an internal angle of between approximately 20 degrees and approximately 50 degrees.

The first apex may have an internal half angle of between approximately 15 degrees and approximately 35 degrees.

BRIEF DESCRIPTION OF THE DRAWINGS

Embodiments of the invention will now be described with reference to the accompanying drawings, in which:

FIG. 18 shows a concave base side of the filler according to a variant;

FIG. 19 shows a fibre reinforced filler;

FIG. 20 shows a variation of the third apex of the filler and corresponding tooling;

DETAILED DESCRIPTION OF EMBODIMENT(S)

Figure 1:
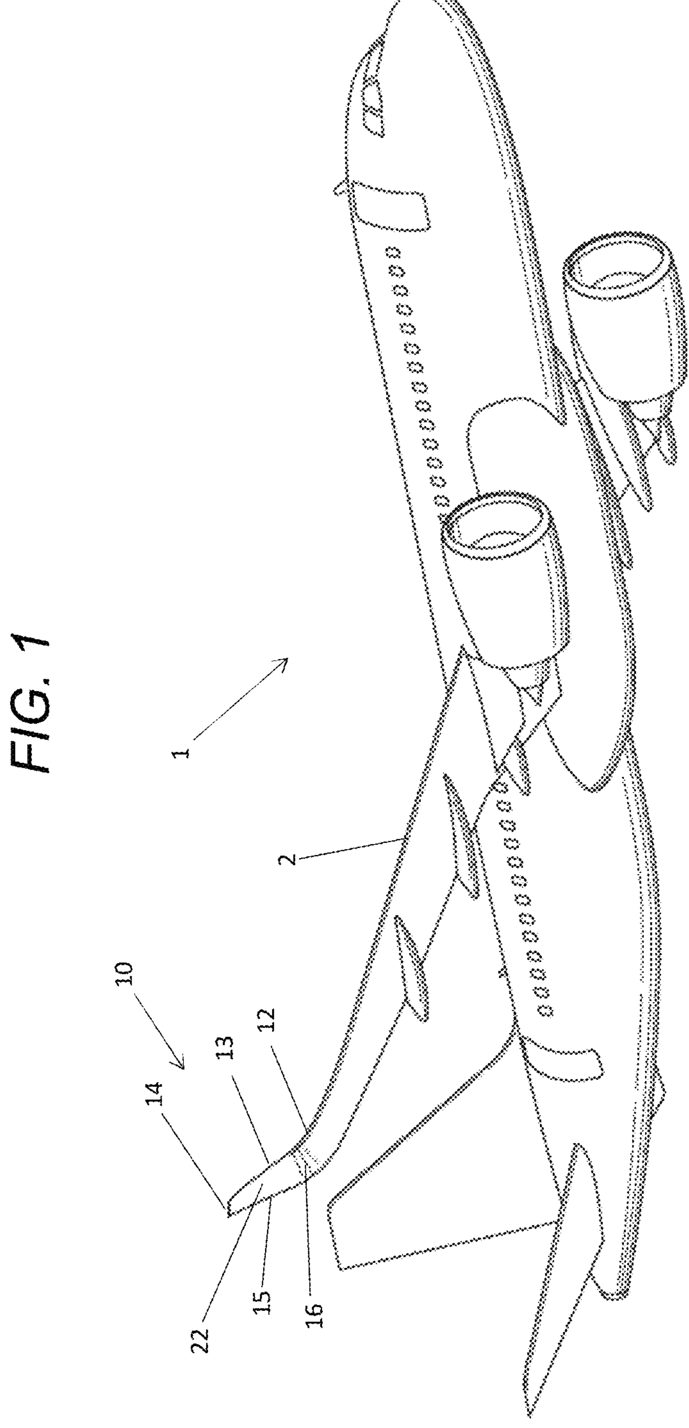
FIG. 1 shows an aircraft with a winglet.

An aircraft 1 shown in FIG. 1 has port and starboard wings extending from a fuselage. Only the starboard wing is shown in FIG. 1, and the port wing is a mirror image. The starboard wing comprises a main wing element 2, and a winglet 10 (or wing tip device). The winglet 10 has a root 12 attached to the tip of the main wing element 2, a tip 14, a leading edge 13, a trailing edge 15, and a curved transition region 16 between the root 12 and the tip 14.

Figures 2, 3, 4:
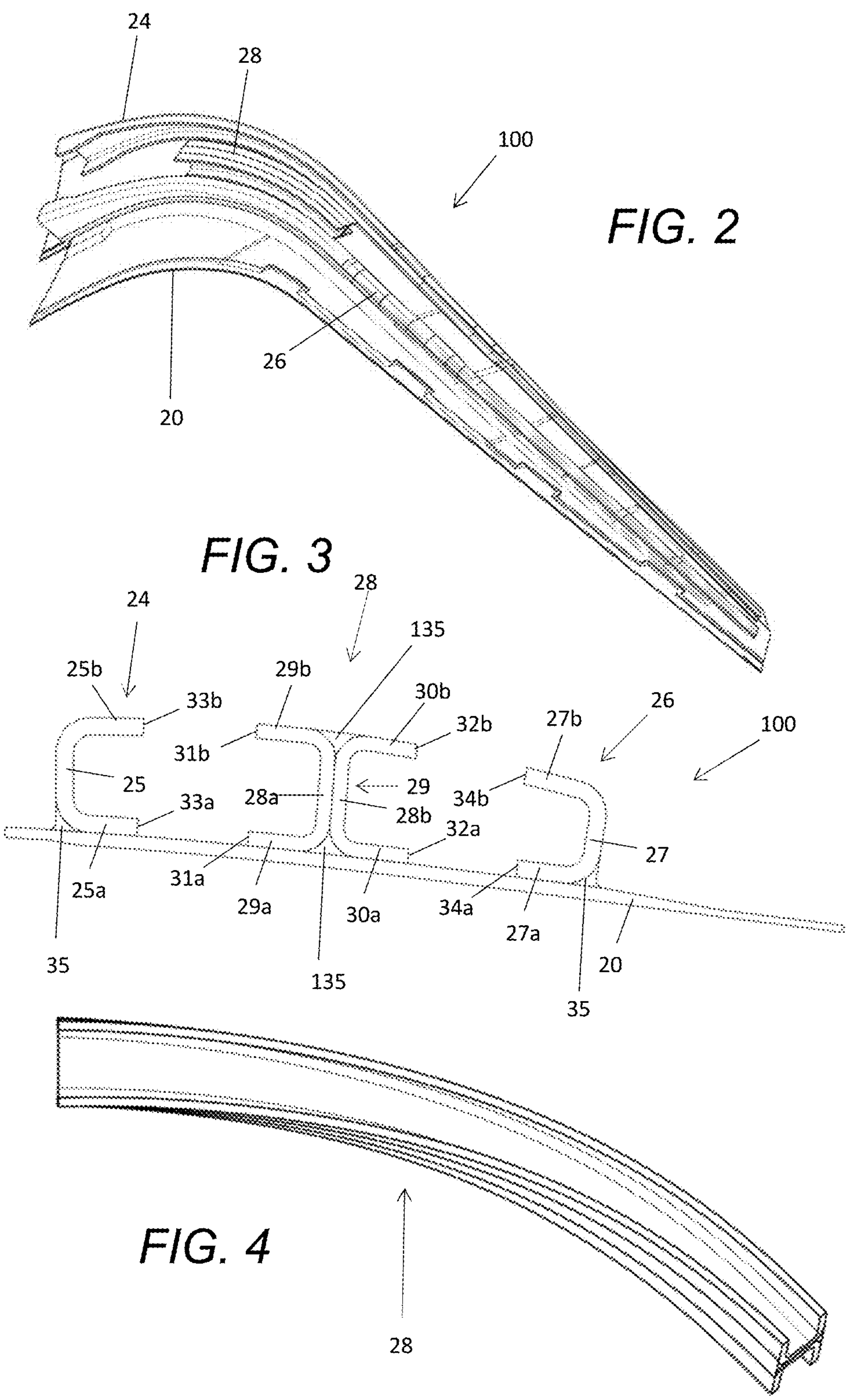
FIG. 2 shows a winglet cover assembly of the winglet.
FIG. 3 is a section view through the spars of the winglet cover assembly.
FIG. 4 shows the mid spar of the winglet.

The winglet 10 has a winglet cover assembly 100, as best shown in FIG. 2, with a first cover 20, a front spar 24, a rear spar 26 and a mid spar 28 between the front spar and the rear spar. The cover 20 and spars 24, 26, 28 of the winglet cover assembly 100 form a unitary structure.

The first cover 20 provides the upper (low pressure) external skin of the winglet and the second cover 22 provides the lower (high pressure) external skin of the winglet.

The covers 20, 22 and the spars 24, 26, 28 are formed from fibre-reinforced composite material, such as carbon-fibre reinforced epoxy resin.

As shown in FIG. 3, the front spar 24 has an aft-directed C-shaped cross-section with a front spar web 25, a first front spar cap 25*a* joining the front spar to the first cover 20 and a second front spar cap 25*b*. The second front spar cap 25*b* joins the front spar to the second cover 22.

The rear spar 26 comprises a rear spar web 27, a first rear spar cap 27*a* joining the rear spar to the first cover 20, and a second rear spar cap 27*b*. The second rear spar cap 27*b* joins the rear spar to the second cover 22.

The front spar caps and the rear spar caps are directed inwardly towards the mid spar 28. Thus the front spar caps 25*a*, 25*b* extend aft from the front spar web 25 to respective edges 33*a*, 33*b*; and the rear spar caps 27*a*, 27*b* extend forward from the rear spar web 27 to respective edges 34*a*, 34*b*.

Each spar 24, 26, 28 is joined to the first cover 20 and to the second cover 22. More specifically, the first cover 20 is co-cured to the spars 24, 26, 28 and the second cover 22 is attached to the spars 24, 26, 28 by fasteners, e.g. by a pair of fasteners per spar cap.

As shown in FIG. 3, the mid spar 28 has an I-shaped cross-section comprising a mid spar web 29, a first pair of mid spar caps 29*a*, 30*a* joining the mid spar web to the first cover 20, and a second pair of mid spar caps 29*b*, 30*b*. The second pair of mid spar caps 29*b*, 30*b* join the mid spar to the second cover 22. Each mid spar cap extends away from the mid spar web 29 to a respective edge 31*a*, 31*b*, 32*a*, 32*b*.

The first pair of mid spar caps comprises a front first mid spar cap 29*a* with a front edge 31*a* and a rear first mid spar cap 30*a* with a rear edge 32*a*. The front first mid spar cap 29*a* extends forwards from the mid spar web 29 to the front edge 31*a* of the forward first mid spar cap. The rear first mid spar cap 30*a* extends aft from the mid spar web 29 to the rear edge 32*a* of the rear first mid spar cap. The first cover 20 is co-cured to the first pair of spar caps 29*a*, 30*a*.

Similarly the second pair of mid spar caps comprises a front second mid spar cap 29*b* with a front edge 31*b* and a rear second mid spar cap 30*b* with a rear edge 32*b*. The front second mid spar cap 29*b* extends forwards from the mid spar web 29 to the front edge 31*b* of the forward second mid spar cap. The rear second mid spar cap 30*b* extends aft from the mid spar web 29 to the rear edge 32*b* of the rear second mid spar cap. The second cover 22 is attached to the second pair of spar caps 29*b*, 30*b* by the fasteners.

Fillers 35, 135 fill the gaps caused by the curved radii where the spar webs meet the spar caps.

Figure 6:
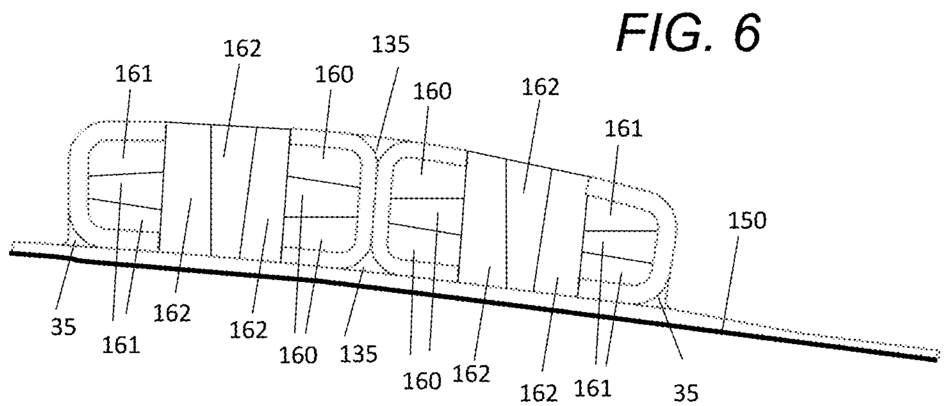
FIG. 6 shows a mandrel arrangement.
Figure 7:
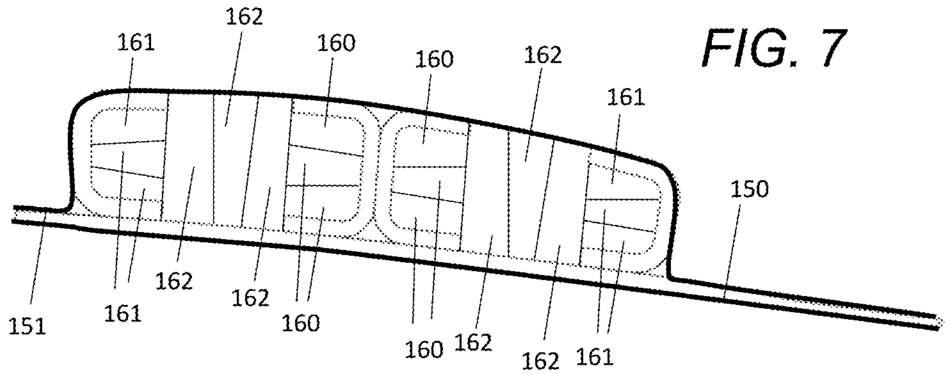
FIG. 7 shows the assembly of FIG. 6, with a second mould tool fitted.

The winglet cover assembly 100 is manufactured by resin transfer moulding (RTM) and then the second cover 22 and leading edge structure are attached to the winglet cover assembly 100 by fasteners. A preferred method of manufacturing the winglet cover assembly 100 by resin transfer moulding is shown in FIGS. 5-7.

Figure 5:
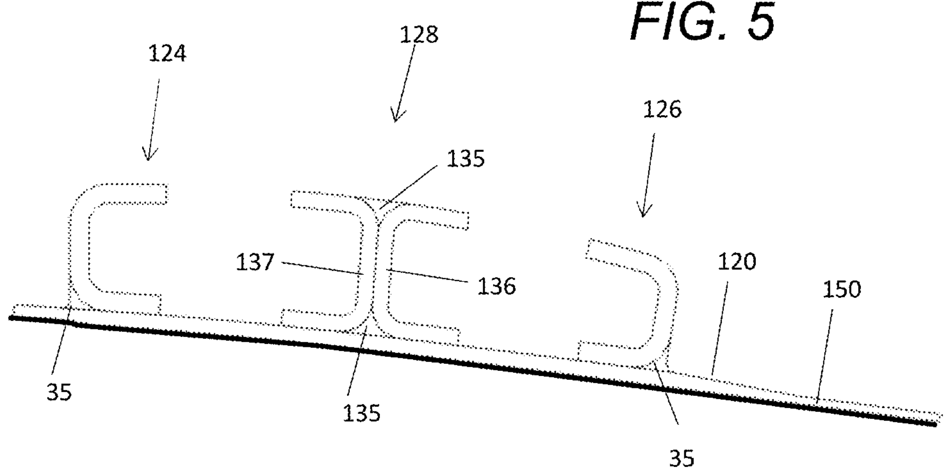
FIG. 5 shows a set of dry-fibre preforms on a mould tool.

The RTM method uses dry-fibre preforms 124, 126, 128 shown in FIG. 5 which, when infused and cured, provide the cover and spars of the winglet cover assembly 100 of FIGS. 2 and 3. The dry-fibre preforms are given the same reference number as the final composite parts, incremented by 100. Thus for example the front spar 24 is formed from a dry fibre preform 124.

In alternative embodiments, the winglet cover assembly 100 may be manufactured by same qualified resin transfer moulding (SQRTM), or any other manufacturing process which forms the winglet cover assembly 100 as a unitary composite structure. As will be understood by the skilled person, SQRTM is an RTM process in which each of the fibre preforms comprises prepreg (i.e. a body of "pre-impregnated" composite fibres in which a thermoset polymer matrix material is present).

A dry-fibre cover preform 120 is arranged on a first mould tool 150. A dry-fibre mid spar preform 128 is then placed on the dry-fibre cover preform 120. The dry-fibre mid spar preform 128 is formed from a pair of back-to-back C-shaped mid spar preforms. The pair of back-to-back C-shaped mid spar preforms comprise an aft C-shaped mid spar preform with a web 136; and a forward C-shaped mid spar preform with a web 137. The webs 136, 137 are placed in contact, back to back, with dry fibre noodles filling the gaps as shown.

Mid spar mandrels 160 are provided in the mid spar preforms as shown in FIG. 6, between the mid spar caps. These mid spar mandrels 160 may be made of Aluminium and may be inserted into the mid spar preforms before or after the mid spar preforms are placed on the cover preform 120. Alternatively, the mid spar preforms may be laid up onto the mid spar mandrels 160.

In this example, three mid spar mandrels 160 are provided in the mid spar on a forward side of the spar web; and three mid spar mandrels 160 are provided in the mid spar on an aft side of the mid spar web. In other embodiments, there may be a different number of mid spar mandrels on each side of the mid spar web, for instance one, two or more than three.

The mid spar mandrels 160 have a tapering wedge shape so that they can be removed laterally from the mid spar—that is, from the left or right direction as viewed in FIG. 6.

Next, front and rear spar preforms 124, 126 are arranged on the dry-fibre cover preform 120.

Spar mandrels 161 are provided in the front and rear spar preforms 124, 126 as shown in FIGS. 5 and 6. The spar mandrels 161 may be made of Aluminium and may be inserted into the front and rear spar preforms 124, 126 before or after the front and rear spar preforms are placed on the cover preform 120. Alternatively, the front and rear spar preforms 124, 126 may be laid up onto the spar mandrels 161.

In this example three front spar mandrels 161 are provided in the front spar; and three rear spar mandrels 161 are provided in the rear spar. In other embodiments, there may be a different number of spar mandrels 161 per spar, for instance one, two or more than three.

The spar mandrels 161 have a tapering wedge shape so that they be removed laterally from the preforms 124, 126—that is, from the left or right as viewed in FIG. 6.

Cover mandrels 162 are also inserted into the gaps between the mid spar preform 128 and the front and rear spar preforms 124, 126. The cover mandrels 162 may be made of Aluminium and may have a tapering wedge shape so that they can be inserted into the gaps from above as viewed in FIG. 6, and removed in reverse.

In this example three cover mandrels 162 are provided between each pair of spars. In other embodiments, there may be a different number of cover mandrels 162 between each pair of spars, for instance one, two or more than three.

A second mould tool 151 is then fitted as shown in FIG. 7, and liquid thermosetting epoxy resin is injected into the cavity between the mould tools 150, 151. The dry fibre preforms 120, 124, 126, 128 are co-infused with the resin, and the assembly is heated so that the resin cures to co-cure the various parts to each other. That is, the first cover 20 is co-cured to the spars; and the back-to-back webs 136, 137 of the mid spar are co-cured to each other.

During the resin transfer moulding process, the mid spar web 29 is compressed, consolidated, shaped and/or moulded by the side faces of the mid spar mandrels 160.

Similarly, the cover preform 20, the first pair of mid spar caps 29*a*, 30*a*, the first front spar cap 25*a* and the first rear spar cap 27*a* are compressed, consolidated, shaped and/or moulded by the mould tool 150 and the bottom faces of the spar mandrels 160, 161 as they become co-infused and co-cured.

The upper faces of the spar mandrels 160, 161 and the second mould tool 151 also apply pressure to the second pair of mid spar caps 29*b*, 30*b*, the second front spar cap 25*b* and the second rear spar cap 27*b* during the resin transfer moulding process, so that they become compressed, consolidated, shaped and/or moulded.

The cover mandrels 162 and mould tool 150 also hold the cover 20 between them during the resin transfer moulding process. Thus the cover 20 is compressed, consolidated, shaped and/or moulded by the bottom faces of the cover mandrels 162 and the mould tool 150 to accurately control the thickness of the external aerodynamic profile of the cover 20.

After the cover assembly 100 has fully cured, the mould tool 151 is removed, the cover mandrels 162 are removed from above, then the spar mandrels 160, 161 are removed from above through the gaps previously occupied by the mandrels cover 162. In other embodiments, the mandrels 160, 161, 162 may not be removed.

In this example, the cover assembly 100 is manufactured by resin transfer moulding from a set of dry-fibre preforms. Alternatively, the cover preform, mid spar preform, front spar preform and rear spar preform may be provided as pre-impregnated (prepreg) fibre preforms, and the prepreg fibre preforms joined together by co-curing or co-bonding. In this case, only a single mould tool may be required, rather than two mould tools 150, 151.

As can be seen in FIGS. 2 and 4, the mid spar 28 has a length, and the mid spar 28 curves along all or part of its length. In this case the mid spar 28 curves along most of its length.

Of particular interest in the example, within the context of this invention, is the configuration of the front and rear spars 24, 26 in relation to the cover 20, which is shown in the cross-section of FIG. 3. In this example the conformance of the co-infused front and rear spar joints and the associated spar radii is ensured by the corner fillers 35.

Figure 10:
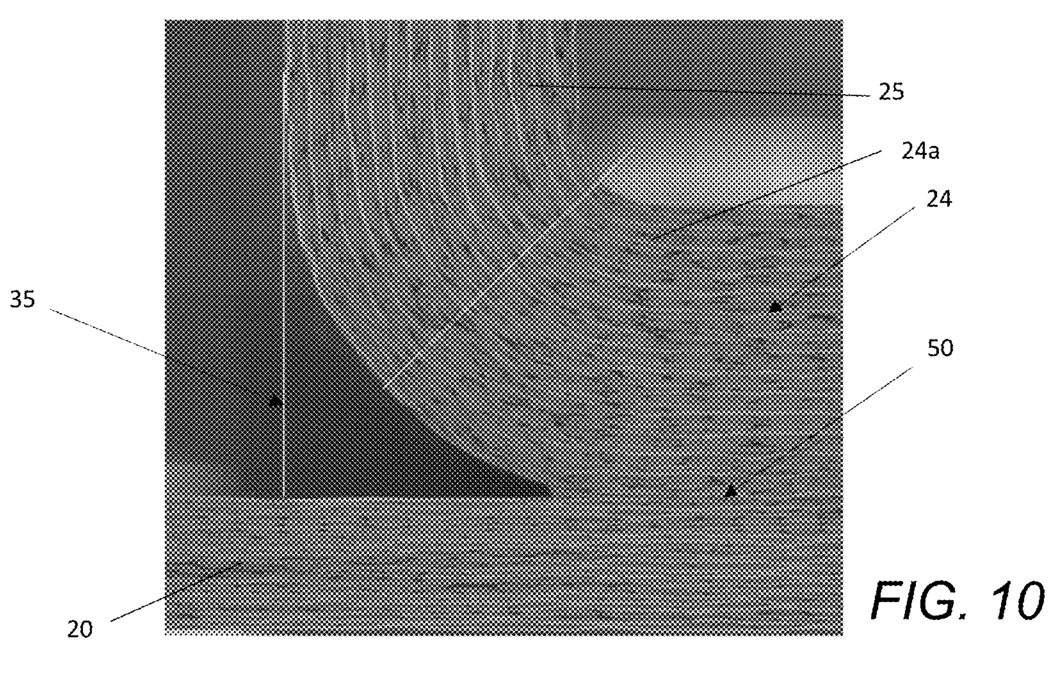
FIGS. 10 to 12 show a comparative example of the impact of a conventional filler used in the manufacture of a carbon fibre based composite spar to cover panel co-infused joint.
Figure 11:
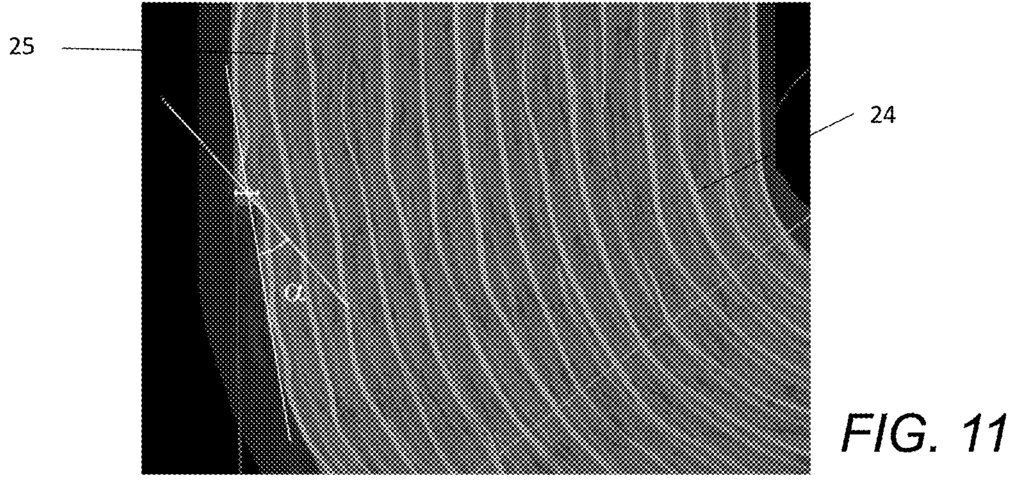
Figure 12:
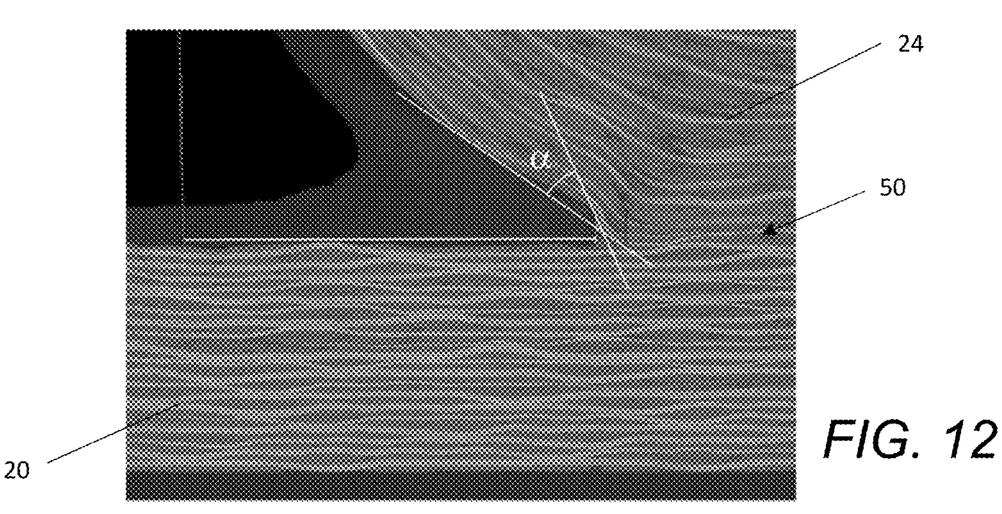

FIGS. 10-12 show a comparative example of the impact of a conventional filler used in the manufacture of a carbon fibre based composite spar to cover panel co-infused joint, such as between the front spar 24 and the cover 20. The front spar 24 is an example of a first laminate composite part having a corner radius. The cover panel 20 is an example of a second composite part. The front spar 24 and the cover 20 are joined together at a joint interface 50. The radius curve of the corner radius may be a constant radius.

Of particular note is the natural out of plane waviness of the fabric materials of the carbon fibre composite laminate used in both the front spar 24 and the cover panel 20, which can be clearly seen in FIGS. 10-12. The natural out of plane waviness is an inherent physical feature presented by some commonly used woven composite materials. What is more subtle, and less desirable, is the step condition that can form around the filler 35 where the corner radius 24*a* of the front spar 24 meets the cover panel 20 at the start of the interface 50, shown in detail in FIG. 12; and also the step condition that can form around the filler 35 where the corner radius 24*a* of the front spar 24 transitions to the front spar web 25, shown in detail in FIG. 11.

Figure 13:
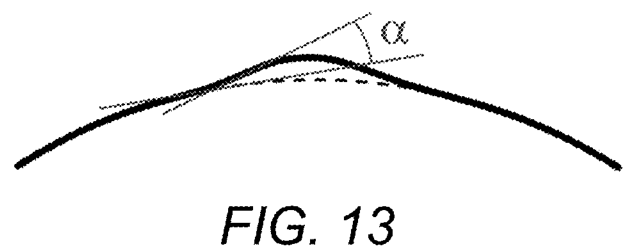
FIG. 13 shows the angles for calculating the ply angle of a ply undulation.

This step condition can give rise to a loss of local structural performance through the introduction of additional ply angular deviations into the composite ply stack. In both of these situations the step condition was created by the profile of the filler 35, which allowed the plies to fold over the edge of the filler 35. Forcing the filler 35 against the composite parts during the cure caused the filler to form an out of plane ply undulation in an outer ply at an outer radius of the corner radius 24*a* of the front spar 24. The outer ply has an out of plane ply undulation angle, alpha, measured between a local tangent of an ideal curve around the corner radius and a tangent of a local ply undulation, as shown in FIG. 13.

Out of plane ply undulation angles less than 5 degrees are likely to have no impact upon the overall structural performance of the corner radius, whereas ply undulation angles between 5 degrees and 30 degrees can present a manageable impact for practical scenarios. Out of plane ply undulation angles above 30 degrees are unfavourable and are to be avoided.

Following these principles and applying them to the geometry of the lower corner example shown within FIGS. 10-12, above, resulted in the evolution of the filler 35.

Figure 14:
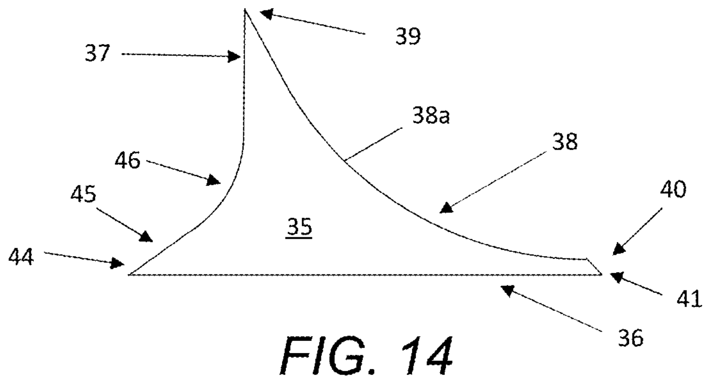
FIG. 14 shows an example of a filler profile.

FIG. 14 shows a first example of a filler 35 according to the invention. The filler 35 is an elongate section, with a length extending in the length dimension of the front spar 24. As discussed above, the front spar 24 may be curved in more than one plane, and so the length dimension is considered to be the longitudinal axis which may follow linearly or along a complex curve. The filler has a cross sectional profile shape normal to the axis of the length dimension. The cross sectional profile may be constant along the length of the filler.

The profile of the filler 35 has a base side 36, a first side 37 extending substantially normal to the base side 36, and a second side 38. The second side 38 is generally concave and extends along a radius curve 38*a* substantially matching a convex outer surface formed by the corner radius of the first laminate composite part (the front spar 24). The second side 38 extends towards a first apex 39 with the first side 37 and towards a second apex 40 with the base side 36. The second apex is formed in a chamfer 41 between the radius curve 38*a* of the second side 38 and the base side 36. The sides of the section are the sides of the cross sectional profile of the filler 35.

As will be discussed in further detail below, the filler 35 may be a structural (load bearing) part adapted to transfer significant load between the first and second composite parts, or may be a non-structural (non-load bearing) part which generally lacks the ability to transfer any significant load between the first and second composite parts. The filler may be a temporary part (such as a temporary tooling filler) used only during joining the first and second composite parts, or may be a permanent part (such as a structural filler) used during joining the first and second composite parts and remaining joined with the first and second composite parts thereafter.

The internal angle of the chamfer 41 forming the second apex is between approximately 20 degrees and approximately 50 degrees. This promotes better control of ply undulations in the first laminate composite part. If the internal angle of the chamfer is too small (less than approximately 20 degrees) then the filler becomes difficult to manufacture and handle as the 'knife edge' may become damaged during handling or removal of the filler. If the internal angle of the chamfer is too large (more than approximately 50 degrees) then when the first and second composite parts are being joined, the filler could cause an out of plane ply undulation in the outermost ply or outer plies of the first laminate composite part which exceeds a threshold ply angle with consequential detrimental effects on the performance of the corner radius of the first laminate composite part after the joint is formed.

The invention enables to constrain the potential for ply deviation within acceptable bounds, which maintains the structural performance whilst accepting that such deviations are present, and also secures the opportunity of removing permanent fillers without incurring any significant additional impacts where these fillers are not required.

Figures 16A, 16B, 16C:
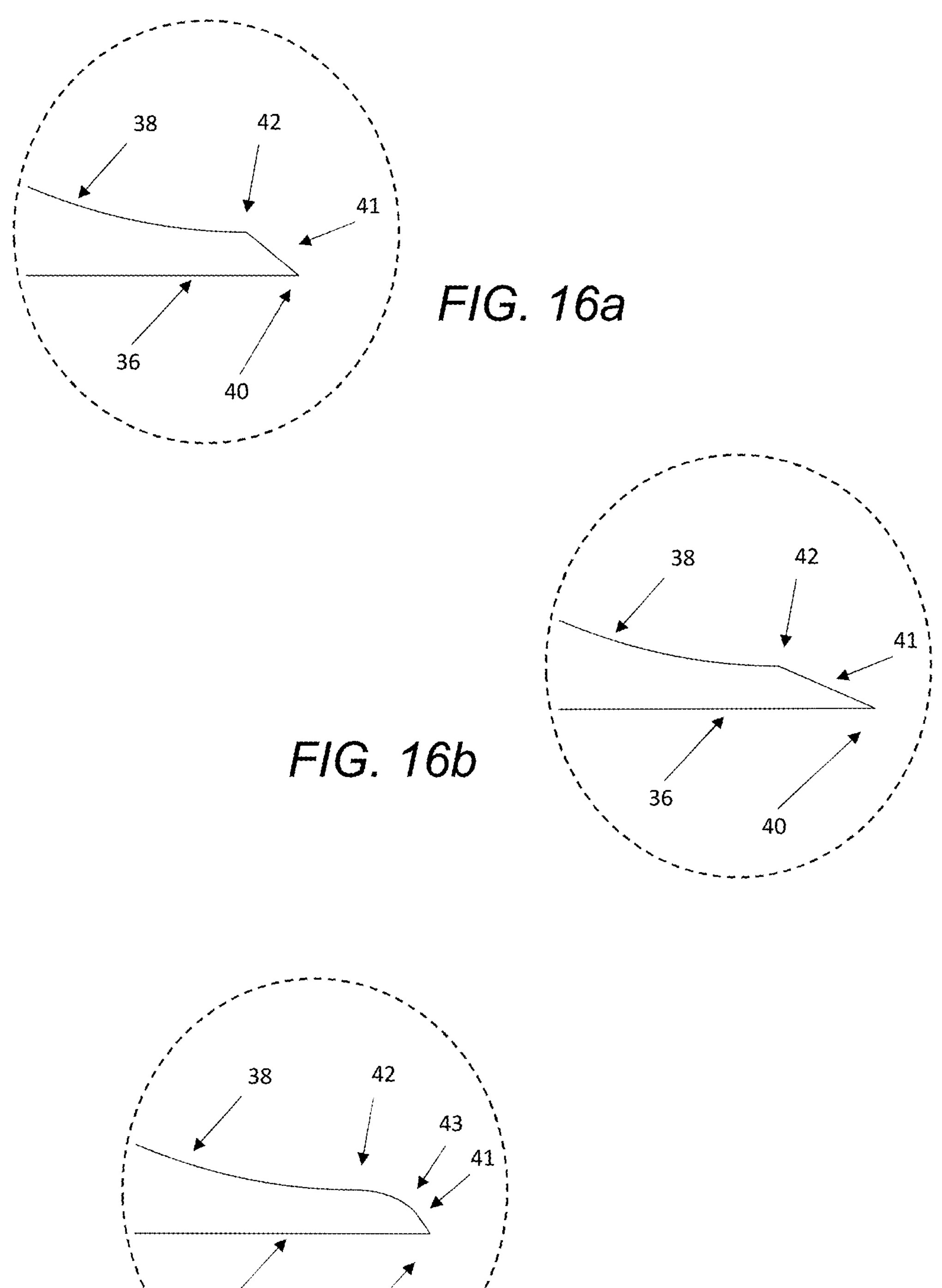
FIGS. 16*a* to 16*c* show variations of the chamfer at the second apex of the filler.

The internal angle of the chamfer 41 may be between approximately 30 degrees and approximately 45 degrees. It has been found that an internal angle of approximately 45 degrees+/−5 degrees may be optimal and that an internal angle of at least 30 degrees may be preferable for manufacturing and handling of the filler. FIG. 16*a* shows a detailed view of the chamfer 41 of the filler of FIG. 14. FIG. 16*b* shows a chamfer 41 with a smaller internal angle than that of FIG. 16*a*, which may be used with the features of the filler of FIG. 14 and variants thereof described herein.

The chamfer may have a length (parallel to the base side) of between approximately 0.5 mm and approximately 2.0 mm, preferably around 1.0 mm.

As can be seen in the example shown in FIGS. 14, 16*a* and 16*b*, the chamfer 41 may be straight. A straight chamfer may create a planar face of the filler 35 at an angle to the base side 36 and to the local tangent to the end of the curved second side 38.

Figure 15:
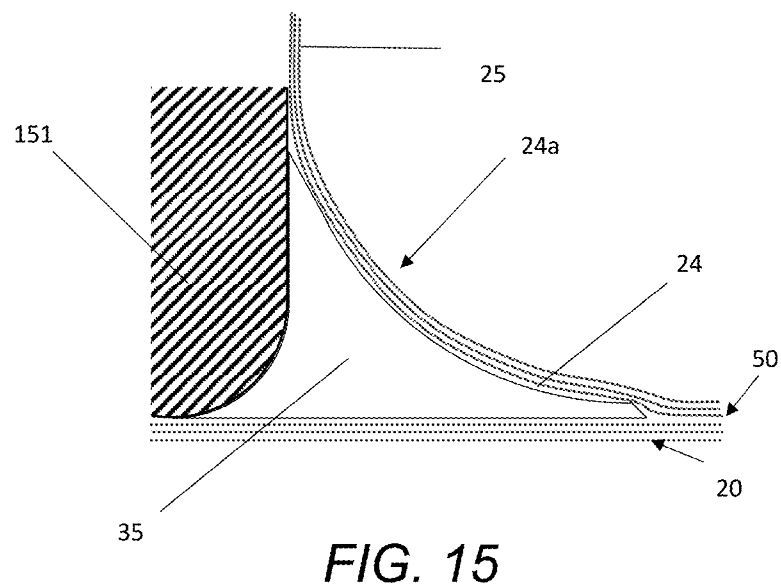
FIG. 15 shows the filler between first and second composite parts and tooling.

FIG. 15 shows the filler 35 located between the corner radius of the first laminate composite part (the front spar 24) and the second composite part (the cover panel 20). As a result of the chamfer 41 the ply angle, alpha, of the ply undulation of the front spar 24 becomes less than 30 degrees near the end of the interface 50.

In an example, the filler 35 is a temporary tooling element. The temporary tooling element may be formed of a suitable elastic material, such as silicone. The temporary tooling element may be formed by casting and the chamfer 41 may be applied to tooling that produces a mould cavity for the casting of the temporary tooling element. It will be appreciated that a wide family of materials and production techniques for the filler 35 may be used depending upon the detailed requirements of the intended overall manufacturing process.

For example, some of these requirements may be the details associated with the moulding pressures and thermal cycles experienced by the final product in production and in turn the temporary tooling elements, whose detailed geometry has to be appropriately set in order to compensated for any likely distortions resulting from the application of the pressure required to consolidate the composite materials, and any thermal expansion likely within the temporary tooling from the application of the required composite material curing temperature.

In an example, shown in FIG. 18 the base side 36 of the filler may be slightly concave to accommodate thermal expansion of the filler. Thermal expansion of the filler under pressure during the cure may cause the slightly concave base side of the filler component to flatten and become substantially co-planar as it co-cures with the second composite part. This may assist with forming a strong co-cured bonded interface between the filler and the second composite part, without the filler deforming into the second composite part.

In an example, the chamfer 41 may transition into the second side 38 as a curve to form a bullnose 43, such as shown in FIG. 16*c*. The bullnose 43 may create a planar face (the chamfer 41) and a rounded edge 43. The planar face or chamfer 41 forms the internal angle to the base side 36 as described above. The bullnose 43 may be used with the features of the filler 35 of FIG. 14 and variants thereof described herein.

The second side 38 may meet the straight chamfer 41 or the bullnose 43 at an inflection 42. The inflection 42 may be a smooth curve (such as shown in FIG. 16*c*) or a cusp (such as shown in FIGS. 16*a*, 16*b*).

Returning to FIG. 14, the first apex 39 of the filler 35 may be formed in a knife edge between the radius curve of the second side 38 and the first side 37. The knife edge may have an internal angle of between approximately 15 degrees and approximately 35 degrees. It has been found that an internal angle of 30 degrees+/−5 degrees may be optimal to limit the ply undulation angle. The internal angle of the knife edge may be approximately 30 degrees.

The upper bound of the range of internal angles of the knife edge at the first apex 39 is selected to ensure the ply angle of the out of plane ply undulations of the front spar 24 does not exceed 30 degrees. The lower bound of the range of internal angles of the knife edge avoids the risk of the filler 35 becoming locally unstable during the stacking, infusion, and curing cycle, or tearing during the de-moulding process, potentially adding the need to rework the final product before acceptance, in addition to the difficulty in controlling the tolerances of the up-stream tooling for the production of the filler 35.

Figure 17A:
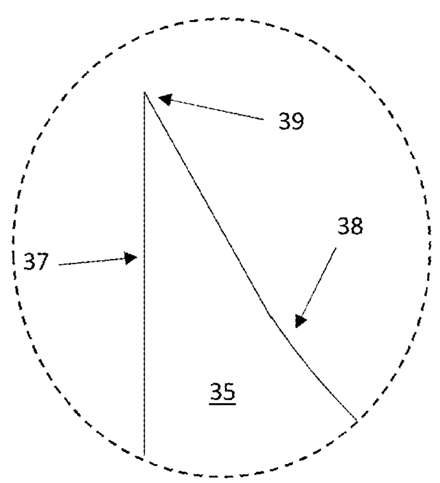
FIGS. 17*a* and 17*b* shows variations of the knife edge at the first apex of the filler.
Figure 17B:
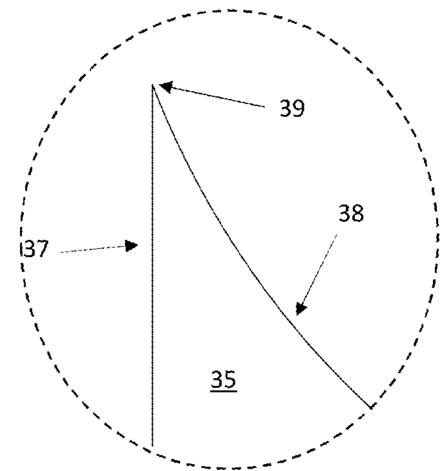

FIGS. 17*a* and 17*b* show detail views of the first apex 39 of the filler 35. In FIG. 17*a* the knife edge may be straight and smoothly transition into the radius curve of the second side 38. Alternatively, as shown in FIG. 17*b*, the knife edge may be smoothly curved into the radius curve of the second side 38. These and other shapes for the first apex may be incorporated in the filler 35 shown in FIG. 14 and variants thereof described herein.

Returning to FIGS. 14 and 15, it can be seen that the selected internal angle of the knife edge at the first apex 39 ensures that when forcing the filler 35 against the composite parts during the cure causes the filler 35 to form an out of plane ply undulation in an outer ply at an outer radius of the corner radius 24*a* of the front spar 24 where it transitions into the (near vertical) web 25 of the front spar 24, but where the ply angle of the undulation is less than 30 degrees.

In FIG. 15, a portion of the second mould tool 151 (described above with reference to FIG. 7) is shown. The second mould tool 151 is a male tool and the filler 35 is shaped to fit with the second mould tool 151.

As shown in FIG. 14 the filler 35 has a third apex 44 between the first side 37 and the base side 36. The third apex 44 may have an internal angle of between approximately 20 degrees and approximately 50 degrees. The third apex 44 may be formed along similar principles to the first apex 39. It has been found that an internal angle of between 30 degrees+/−5 degrees and 45 degrees+/−5 degrees may be optimal. The first side 37 is shaped as a radius 46 with a tangent forming a chamfer 45 having the internal angle. The chamfer 45 forms the internal angle at the third apex 44. The first side 37 therefore has a first portion extending substantially normal to the base side 36 towards the first apex, and a second portion (e.g. the radius 46 and the chamfer 45) extending away from the first portion in a direction away from the second side and towards the third apex.

The second mould tool 151 has a profile to match the shape of the third apex 44 of the filler 35.

FIG. 20 shows another example of the filler in which the profile of the third apex 44 is formed as a relatively large chamfer 45 between the base side 36 and the first side 37 with a matching profile of the second mould tool 151, to replace the radius with a tangent forming the chamfer. The large chamfer 45 may have a chamfer angle of 45 degrees but this angle can be set to be sympathetic to the overall configuration of the final product as needed.

The filler 35 may comprise polymer material 35*a*, optionally a fibre reinforced polymer material including reinforcing longitudinal fibres 35*b* as shown in FIG. 19.

Figure 8:
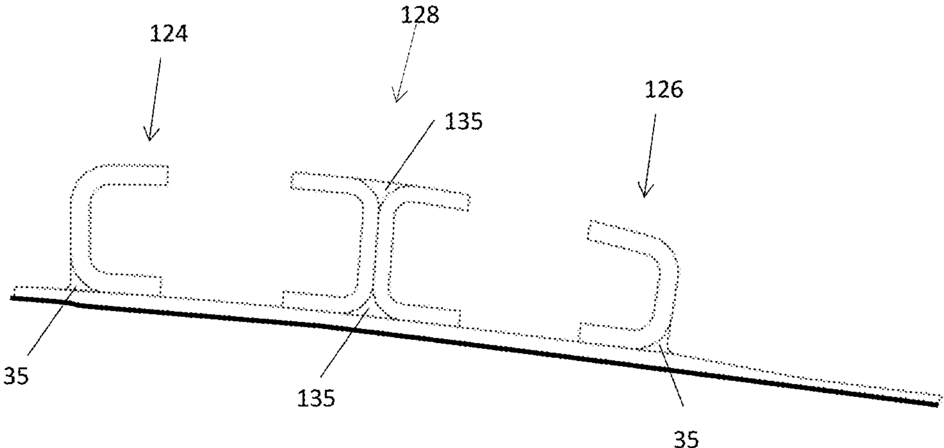
FIG. 8 shows the de-moulded spar and cover with fillers retained.
Figure 9:
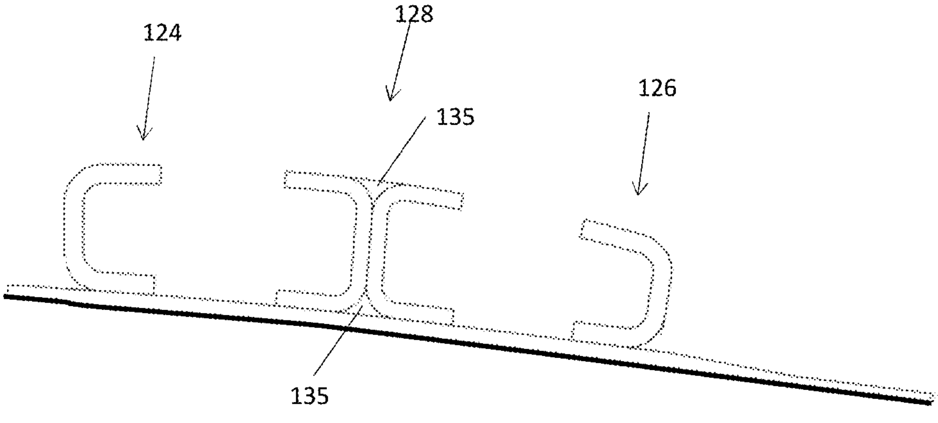
FIG. 9 shows the de-moulded spar and cover with some fillers removed.

FIG. 8 shows the filler 35 remaining in situ as a permanent filler after the curing of the first and second composite parts. FIG. 9 shows the filler 35 removed after the curing of the first and second composite parts, the filler therefore being temporary tooling.

Figure 21:
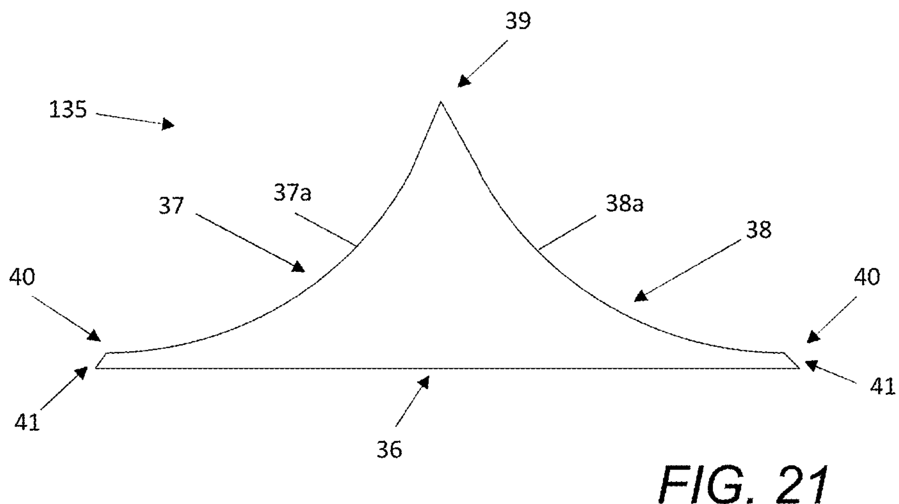
FIG. 21 shows a further example of a filler.
Figure 22:
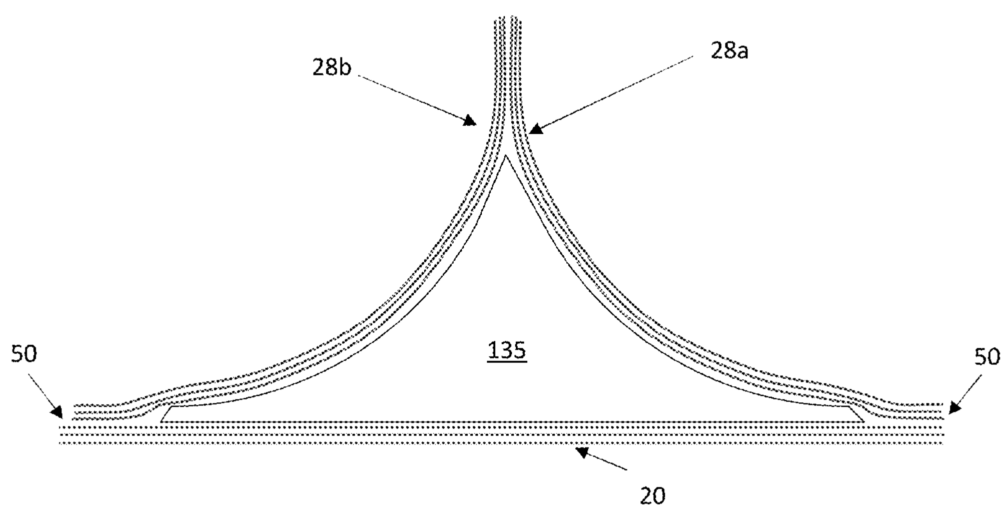
FIG. 22 shows the filler between two first composite parts.

FIGS. 21 and 22 show a further embodiment in which the filler 135 is a noodle used between the back to back spars 28*a*, 28*b* of the middle spar 28 shown in FIG. 3.

The filler 135 is for insertion between the two first laminate composite parts 28*a*, 28*b* of spar 28, each having a corner radius and arranged back to back, prior to joining the two first laminate composite parts together at a joint interface. The filler 135 is an elongate section comprising: a base side 36, a first side 37, and a second side 38. The first side 37 is generally concave and extends along a radius curve 37*a* substantially matching a convex outer surface formed by the corner radius of one of the two first laminate composite parts, and towards a first apex 39 with the second side 38 and towards a second apex 40 with the base side 36. The second side 38 is generally concave and extends along a radius curve 38*a* substantially matching a convex outer surface formed by the corner radius of the other one of the two first laminate composite parts, and towards the first apex 39 with the first side and towards another second apex 40 with the base side 36. Each second apex 40 is formed in a chamfer 41 between the radius curve of the respective second side 37*a*, 38*a* and the base side 36. The chamfers 41 each have an internal angle of between approximately 20 degrees and approximately 50 degrees.

The principles of the shape of the profile of the filler 135 are the same as for the filler 35 described previously. In particular, the chamfer 41 at the second apex is identical (or mirror image) of the same feature of the filler 35.

The first apex 39 may have an internal half angle of between approximately 15 degrees and approximately 35 degrees.

FIG. 22 shows the filler 135 located between the corner radii of the two first laminate composite part (the back to back spar portions 28*a*, 28*b* of the middle spar 28) and optionally also a second composite part (the cover panel 20). As a result of the chamfer 41 the ply angle, alpha, of the ply undulation of the middle spar 28 becomes less than 30 degrees near the end of the interface 50.

In an example, the filler 135 is a permanent filler or 'noodle' formed from fibre reinforced polymer material, similar to that described above. It will be appreciated that the angle and form of the first and second apex of the filler 135 may be varied in the same way as described above for the filler 35 and so those details will not be repeated again here.

In conclusion, this invention provides principles to follow in order to configure a temporary or permanent filler part for co-infused and co-cured joints in composite materials, that balance manufacturing feasibility with structural performance requirements by keeping within the bounds of performance assessment margins.

Where the word 'or' appears this is to be construed to mean 'and/or' such that items referred to are not necessarily mutually exclusive and may be used in any appropriate combination.

Although the invention has been described above with reference to one or more preferred embodiments, it will be appreciated that various changes or modifications may be made without departing from the scope of the invention as defined in the appended claims.

The invention claimed is:

1. A filler for insertion between a first laminate composite part having a corner radius and a second composite part prior to joining together at a joint interface, the filler is an elongate section comprising:

a base side, a first side extending substantially normal to the base side, a second side is generally concave and extends along a radius curve substantially matching a convex outer surface formed by the corner radius of the first laminate composite part, and towards a first apex with the first side and towards a second apex with the base side, wherein the second apex is formed in a chamfer between the radius curve of the second side and the base side, the chamfer having an internal angle of between approximately 20 degrees and approximately 50 degrees.

2. The filler according to claim 1, wherein the chamfer is straight.

3. The filler according to claim 1, wherein the chamfer transitions into the second side as a curve to form a bullnose.

4. The filler according to claim 2, wherein the second side meets the straight chamfer or the bullnose at an inflection.

5. The filler according to claim 4, wherein the inflection is a smooth curve or a cusp.

6. The filler according to claim 1, wherein the internal angle of the chamfer is between approximately 30 degrees and approximately 45 degrees.

7. The filler according to claim 1, wherein the chamfer has a length of between approximately 0.5 mm and approximately 2.0 mm.

8. The filler according to claim 1, wherein the first apex is formed in a knife edge between the radius curve of the second side and the first side.

9. The filler according to claim 1, wherein the knife edge has an internal angle of between approximately 15 degrees and approximately 35 degrees.

10. The filler according to claim 9, wherein the internal angle is approximately 30 degrees.

11. The filler according to claim 9, wherein the knife edge is straight and smoothly transitions into the radius curve of the second side.

12. The filler according to claim 9, wherein the knife edge is smoothly curved into the radius curve of the second side.

13. The filler according to claim 1, wherein the radius curve has a constant radius.

14. The filler according to claim 1, wherein the base side is substantially straight.

15. The filler according to claim 1, wherein the base side is concave.

16. The filler according to claim 1, wherein the section has a third apex between the first side and the base side.

17. The filler according to claim 16, wherein the third apex has an internal angle of between approximately 20 degrees and approximately 50 degrees.

18. The filler according to claim 16, wherein the first side has a first portion extending substantially normal to the base side towards the first apex, and a second portion extending away from the first portion in a direction away from the second side and towards the third apex.

19. The filler according to claim 18, wherein the second portion is straight forming an angle with the first portion, or wherein the second portion is curved smoothly into the first portion.

20. The filler according to claim 18, wherein the first side is shaped to match with a surface of a tooling element for use with the filler during joining the first and second composite parts.

21. A joint between a first composite part and a second composite part, the first composite part is a laminate having a corner radius and a first interface surface adjacent the corner radius, the second composite part has a second interface surface, the first interface surface is joined to the second interface surface, and further comprising the filler according to claim 1, wherein the base side of the filler is positioned against the second composite part adjacent the second interface surface, and the second side of the filler is positioned against the radius corner of the first composite part.

22. The joint according to claim 21, wherein the filler is a temporary tooling element adapted to be removed from the joint between the first composite part and the second composite part before use.

23. The joint according to claim 21, wherein the filler is a permanent filler adapted to remain with the joint during use.

24. The joint according to claim 21, wherein the first composite laminate part has an outer ply at an outer radius of the corner radius, wherein the outer ply has an out of plane ply undulation angle, alpha, measured between a local tangent of an ideal curve around the corner radius and a tangent of a local ply undulation, and wherein alpha is not more than 30 degrees.

25. The joint according to claim 21, wherein the filler comprises polymer material or a fibre reinforced polymer material.

26. A method of joining a first composite part and a second composite part, comprising:

providing a first composite part, wherein the first composite part is a laminate having a corner radius and a first interface surface adjacent the corner radius;

providing a second composite part, wherein the second composite part has a second interface surface adjacent the first interface surface, providing a filler according to claim 1 and positioning the filler such that the second side of the filler is adjacent a convex outer surface formed by the corner radius of the first laminate composite part, and such that the base side of the filler is adjacent the second composite part, joining the first composite part to the second composite part by co-curing the first and second composite parts under positive pressure such that the filler is forced against the first and second composite parts during the cure.

27. The method according to claim 26, wherein the filler is removed after the co-curing.

28. The method according to claim 26, wherein forcing the filler against the first and second composite parts during the cure causes the filler to form an out of plane ply undulation in an outer ply at an outer radius of the corner radius of the first composite laminate part, wherein the outer ply has out of plane ply undulation has an angle, alpha, measured between a local tangent of an ideal curve around the corner radius and a tangent of a local ply undulation, and wherein alpha is not more than 30 degrees.

29. The method according to claim 26, wherein the base side of the filler is concave such that the base side deforms to becomes substantially co-planar with the second composite part during the cure.

30. A filler for insertion between two first laminate composite parts each having a corner radius and arranged back to back prior to joining the two first laminate composite parts together at a joint interface, the filler is an elongate section comprising:

a base side, a first side, and a second side, wherein the first side is generally concave and extends along a radius curve substantially matching a convex outer surface formed by the corner radius of one of the two first laminate composite parts, and towards a first apex with the second side and towards a second apex with the base side, wherein the second side is generally concave and extends along a radius curve substantially matching a convex outer surface formed by the corner radius of the other one of the two first laminate composite parts, and towards the first apex with the first side and towards another second apex with the base side, wherein each second apex is formed in a chamfer between the radius curve of the respective second side and the base side, the chamfer having an internal angle of between approximately 20 degrees and approximately 50 degrees.

31. The filler according to claim 30, wherein the first apex has an internal half angle of between approximately 15 degrees and approximately 35 degrees.

* * * * *